(12) United States Patent
Haggerty

(10) Patent No.: US 12,272,939 B2
(45) Date of Patent: Apr. 8, 2025

(54) ELECTRICAL SYSTEM

(71) Applicant: Lear Corporation, Southfield, MI (US)

(72) Inventor: Michael Haggerty, Grand Blanc, MI (US)

(73) Assignee: Lear Corporation, Southfield, MI (US)

( * ) Notice: Subject to any disclaimer, the term of this patent is extended or adjusted under 35 U.S.C. 154(b) by 301 days.

(21) Appl. No.: 18/086,903

(22) Filed: Dec. 22, 2022

(65) Prior Publication Data

US 2024/0213760 A1 Jun. 27, 2024

(51) Int. Cl.
*H02H 3/08* (2006.01)
*H02H 1/00* (2006.01)
*H02H 9/02* (2006.01)

(52) U.S. Cl.
CPC ............ *H02H 3/08* (2013.01); *H02H 1/0007* (2013.01)

(58) Field of Classification Search
CPC .............................. H02H 3/08; H02H 1/0007
USPC ........................................................ 361/93.1
See application file for complete search history.

(56) References Cited

U.S. PATENT DOCUMENTS

| | | | |
|---|---|---|---|
| 4,674,047 A * | 6/1987 | Tyler | F42D 1/055 102/206 |
| 5,870,046 A | 2/1999 | Scott | |
| 6,442,213 B1 | 8/2002 | Krone | |
| 7,773,733 B2 | 8/2010 | Bark | |
| 9,106,270 B2 | 8/2015 | Puterbaugh | |
| 10,328,801 B2 | 6/2019 | Kube | |
| 2021/0344186 A1* | 11/2021 | Schuler | H02H 3/046 |
| 2022/0297542 A1* | 9/2022 | Reinprecht | B60L 3/04 |

FOREIGN PATENT DOCUMENTS

| | | |
|---|---|---|
| DE | 102011014343 A1 | 9/2012 |
| DE | 102012214835 A1 | 2/2014 |
| DE | 102012214879 A1 | 2/2014 |
| DE | 102014206270 A1 | 10/2015 |
| GB | 2489101 A | 9/2012 |
| WO | 2015149994 A1 | 10/2015 |

\* cited by examiner

*Primary Examiner* — Jared Fureman
*Assistant Examiner* — Lucy M Thomas
(74) *Attorney, Agent, or Firm* — Fishman Stewart PLLC

(57) ABSTRACT

A system includes a power source, an electrical load, a pyrotechnic fuse, a pyrotechnic fuse, and/or an electrical subsystem, in some configurations. The load may be selectively electrically connected to the power source. The fuse may be electrically connected between the power source and the load. The subsystem may be electrically connected to the power source and the fuse. The subsystem may include a first circuit section, a second circuit section, and/or a capacitive coupler. The first circuit section may include a fault detector that detects faults associated with the power source. The second circuit section may include a fuse actuator. The capacitive coupler may be electrically connected to the fault detector and the fuse actuator. The capacitive coupler may isolate the first circuit section from the second circuit section. In accordance with detecting a fault, the subsystem may actuate the fuse to disconnect the power source from the load.

20 Claims, 5 Drawing Sheets

ELECTRICAL SYSTEM

TECHNICAL FIELD

The present disclosure generally relates to electrical systems, including power sources, electrical loads, and/or pyrotechnic fuses that may, for example, be utilized in connection with and/or incorporated in vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
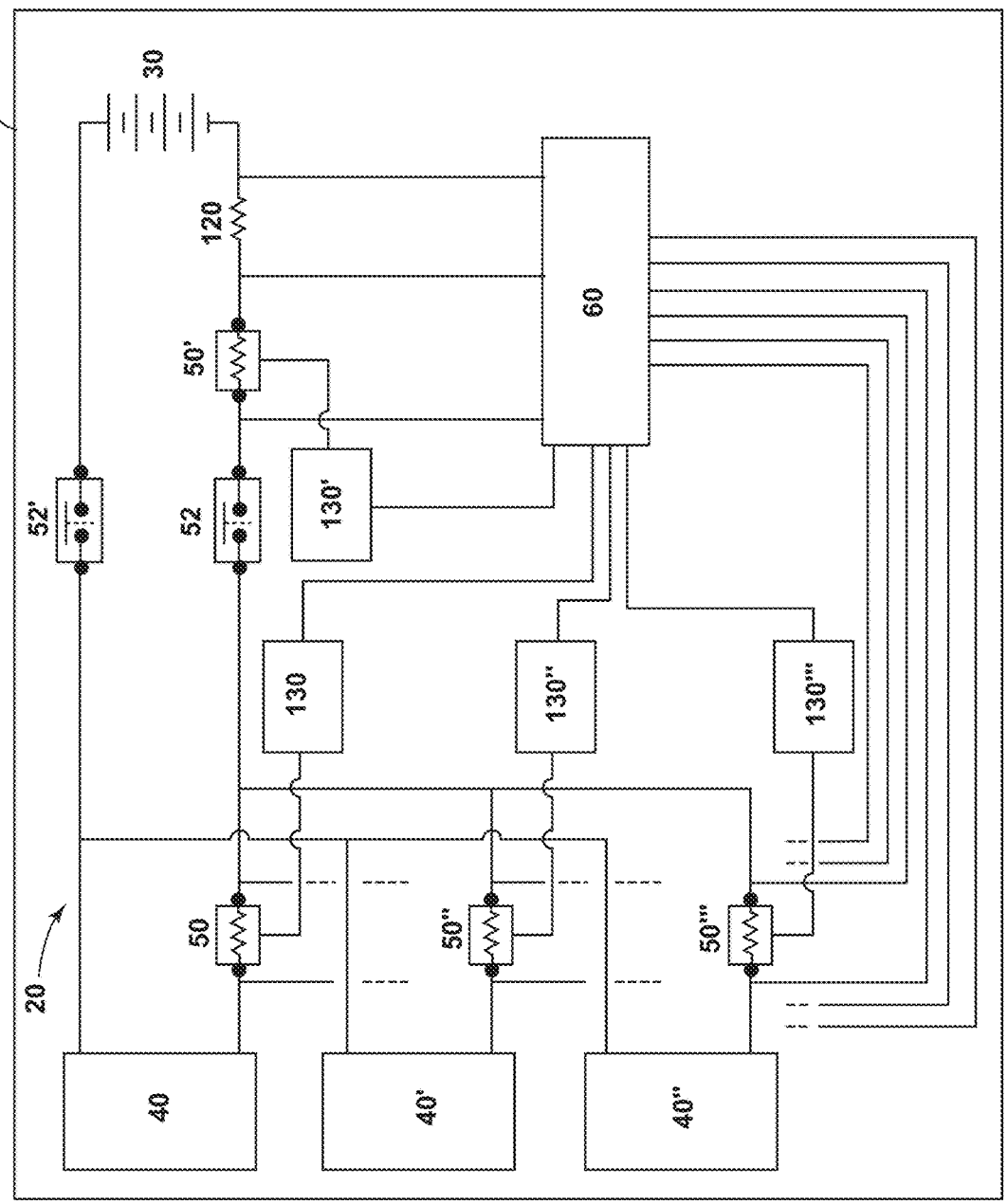
FIG. 1 is a schematic view generally illustrating an embodiment of an electrical system according to teachings of the present disclosure.
Figure 2:
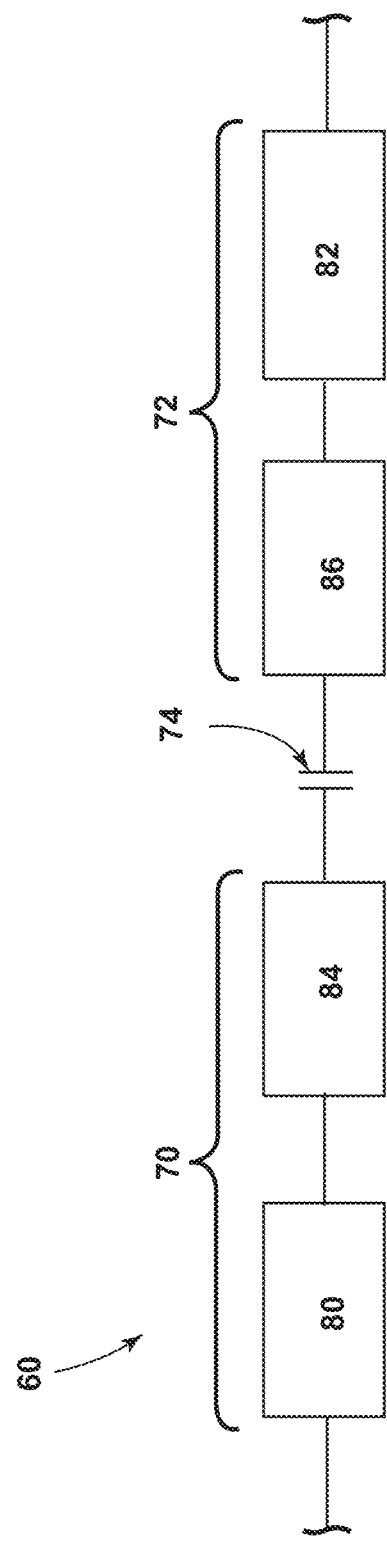
FIG. 2 is a schematic view generally illustrating an embodiment of an electrical subsystem according to teachings of the present disclosure.

FIGS. 1 and 2 present an electrical system 20 including a power source 30, an electrical load 40, a pyrotechnic fuse 50, and an electrical subsystem 60. The load 40 is selectively electrically connected to the power source 30. The fuse 50 is electrically connected between the power source 30 and the load 40. The subsystem 60 is electrically connected to the power source 30 and the fuse 50. Referring now to FIG. 2, in some example configurations, the subsystem 60 includes a first circuit section 70 (e.g., a high voltage section), a second circuit section 72 (e.g., a low voltage section), and/or a coupler 74. The first circuit section 70 includes a fault detector 80. The fault detector 80 is configured to detect faults associated with the power source 30 (e.g., an overcurrent, an overload, and/or a short circuit, among others). The second circuit section 72 includes a fuse actuator 82. The coupler 74 is connected to the fault detector 80 and the fuse actuator 82. The coupler 74 isolates the first circuit section 70 from the second circuit section 72. In accordance with detecting a fault, the subsystem 60 is configured to actuate the fuse 50 via the fuse actuator 82 to disconnect the power source 30 from the load 40. In some instances, the subsystem 60 is configured to disconnect the power source 30 in 5 ms or less in accordance with detecting a fault. For example, pyrotechnic fuses 50 may be actuated faster than other types of fuses, such as thermal fuses.

With reference to FIG. 1, an electrical system 20 may be incorporated with and/or disposed in a vehicle 22 but is not limited to vehicle applications. A vehicle 22 may include one or more of a variety of configurations. For example and without limitation, a vehicle 22 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air and water, etc.), among others.

With embodiments, a power source 30 may include one or more of a variety of configurations. For example and without limitation, a power source 30 may include a battery, a capacitor, a solar panel, a power converter, and/or an outlet, among others. A power source 30 is configured to provide a high voltage. In some implementations, a power source 30 provides a voltage of at least 300 V. In some instances, a power source 30 provides a voltage of at least 800 V and/or at least 1000 V.

With continued reference to FIG. 1, the electrical system 20 includes a plurality of electrical loads 40, such as an electrical load 40, a second electrical load 40', and/or a third electrical load 40", among others. The loads 40 are selectively connected to the power source 30. An electrical load 40 may, for example and without limitation, include a single load or a plurality of loads, such as one or more vehicle systems or components (e.g., air conditioner, heater, electric motor, etc.). In some examples of vehicle applications, one or more electrical loads 40 may include electric motors configured to move a vehicle 22.

In some example configurations, the electrical system 20 includes a plurality of pyrotechnic fuses 50, such as a first pyrotechnic fuse 50, a second pyrotechnic fuse 50', a third pyrotechnic fuse 50", and/or a fourth pyrotechnic fuse 50'", among others. The fuses 50 are electrically connected to the electrical subsystem 60. For instance, the fuses 50 are connected to the fuse actuator 82. In some example configurations, the first fuse 50 and/or the second fuse 50' are connected between the power source 30 and the load 40. The third fuse 50" may be connected between the power source 30 and the second load 40'. The fourth fuse 50'" may be connected between the power source 30 and the third load 40". In accordance with being actuated, a pyrotechnic fuse 50 disconnects an electrical load 40 from the power source 30 such that damage to the electrical load 40 is limited and/or prevented. A pyrotechnic fuse 50 may, for example, include a squib that, when detonated, drives a mechanical separator into a bus bar to open/disconnect an electrical connection.

In some implementations, the electrical system 20 includes one or more switches 52 (e.g., switches 52, 52'). A switch 52 is electrically connected between the power source 30 and an electrical load 40. In some example configurations, the load 40 is selectively connected to the power source 30 via the switch 52 and a pyrotechnic fuse 50. In some implementations, a switch 52 is disposed between a fuse 50 and a second fuse 50'. In some examples, in accordance with detecting a fault, the electrical subsystem 60 is configured to actuate one or more fuses 50 to protect a switch 52 from undesirable exposure to excess electrical current from the power source 30.

Figure 3A:
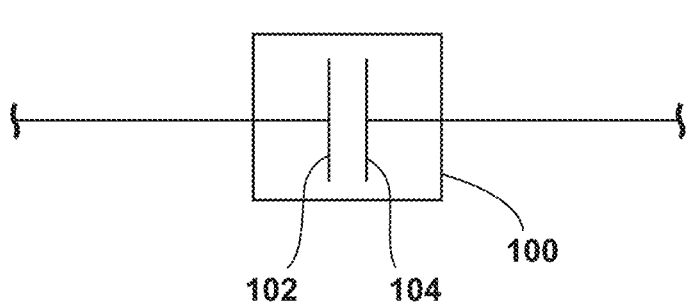
FIGS. 3A-3C are schematic views generally illustrating embodiments of a coupler for an electrical subsystem according to teachings of the present disclosure.
Figure 3B:
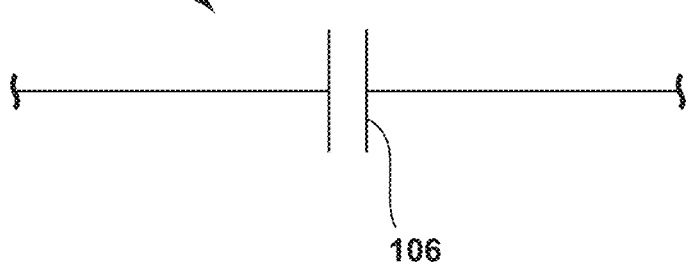
Figure 3C:
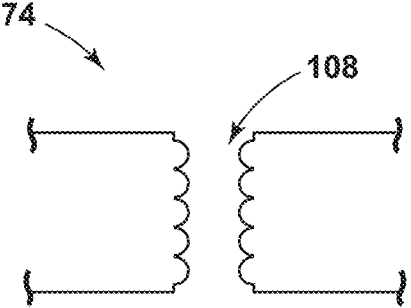

With reference to FIGS. 3A-3C, the coupler 74 is configured to isolate the first circuit section 70 of the electrical subsystem 60 from the second circuit section 72 of the electrical subsystem 60. The first circuit section 70 includes a high voltage section of the electrical subsystem 60. The first circuit section 70 is configured to be used in connection with high voltages and/or large electrical currents produced by the power source 30. The second circuit section 72 includes a low voltage section of the electrical subsystem 60. The second circuit section 72 may not be configured to be used in connection with the high voltages and/or the large electrical currents produced by the power source 30. For example and without limitation, at least one component of the second circuit section 72 (e.g., the fuse actuator 82) is configured to be used with a maximum voltage of 100 V or less (e.g., about 12 V). The coupler 74 allows the first circuit section 70 to detect and communicate a fault in connection with the high voltage power source 30 to the second circuit section 72 and allows the second circuit section 72 to actuate one or more applicable fuses 50 while limiting or preventing risks of connecting a high voltage or high current source to the second circuit section 72.

Referring to FIG. 3A, in some example configurations, a coupler 74 includes a capacitive coupler. The coupler 74 may, in some instances, be embedded within a circuit board 100 (e.g., a PCB). The coupler 74 may include a first plate 102 and a second plate 104. The first plate 102 and/or the second plate 104 may be etched into the circuit board 100. Referring to FIG. 3B, in some instances, a coupler 74 includes a parallel plate capacitor 106. Referring to FIG. 3C, in some examples, a coupler 74 includes a transformer 108.

Referring again to FIG. 1, in some example configurations, the fault detector 80 includes a current sensor 120 (e.g., a precision current sensor, a shunt resistor, and/or a Hall sensor, among others) electrically connected between the power source 30 and an electrical load 40. The fault detector 80 is configured to detect a fault, for example and without limitation, when electrical current provided by the power source 30 exceeds a predetermined threshold. The fault detector 80 is configured to communicate the fault to one or more other components of the electrical subsystem 60.

In some implementations, the fuse actuator 82 includes a pyrotechnic actuator control interface and/or a plurality of detonators 130, such as a first detonator 130, a second detonator 130', a third detonator 130", and/or a fourth detonator 130''', among others. A detonator 130 is electrically connected to and/or is configured to actuate a fuse 50. For example and without limitation, a detonator 130 may be electrically connected to and/or may be configured to actuate the fuse 50, the second detonator 130' may be electrically connected to and/or may be configured to actuate the second fuse 50', the third detonator 130" may be electrically connected to and/or may be configured to actuate the third fuse 50", and/or the fourth detonator 130''' may be electrically connected to and/or may be configured to actuate the fourth fuse 50'''. In some instances, the fuse actuator 82 is configured to transmit a signal/command to a detonator 130 to activate a fuse 50.

Referring again to FIG. 2, the first circuit section 70 includes a timer generator 84. The timer generator 84 is electrically connected to the fault detector 80. The fault detector 80 is configured to transmit DC signals to the timer generator 84. The timer generator 84 is configured to convert the DC signals from the fault detector 80 into AC signals and/or is configured to transmit the AC signals to the coupler 74. The timer generator 84 may, for example, include a relaxation oscillator.

In some example configurations, the second circuit section 72 includes a charge pump 86. The charge pump 86 is electrically connected to the coupler 74 and the fuse actuator 82. The charge pump 86 is configured to convert the AC signals from the coupler 74 and/or the timer generator 84 to DC signals and/or is configured to transmit the DC signals to the fuse actuator 82. The charge pump 86 may, for example, act as a rectifier.

Figure 4:
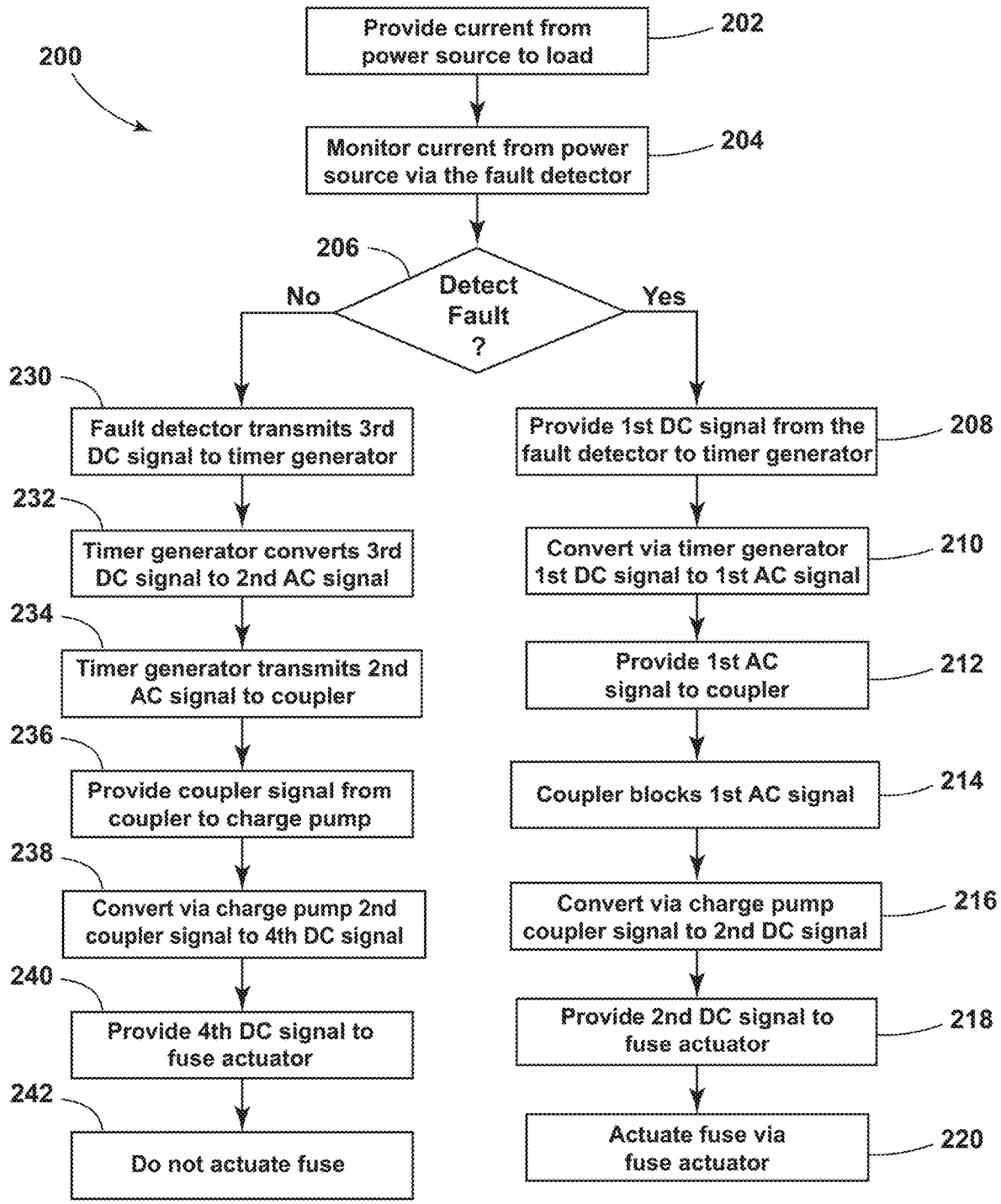
FIG. 4 is a flow diagram generally illustrating an embodiment of a method of operating an electrical system according to teaching of the present disclosure.

FIG. 4, presents a method 200 of operating the electrical system 20. The method 200 includes providing current from the power source 30 to a load 40 (block 202) and monitoring the current from the power source 30 via the fault detector 80 (block 204). If a fault (e.g., an overcurrent, an overload, and/or a short circuit, among others) is detected at block 206, the method includes the fault detector 80 providing a first DC signal (e.g., a detonate fuse signal, 0 V signal) to the timer generator 84 of the first circuit section 70 (block 208). The timer generator 84 may then convert the first DC signal to a first AC signal (block 210) and provide the first AC signal to the coupler 74 (block 212). The first AC signal may, for example and without limitation, include a 0 Hz square wave, but may include other configurations and/or frequencies. If the frequency of the first AC signal is below a threshold, the coupler 74 may effectively block the first AC signal from further transmission and/or provide a coupler signal that may include an AC signal with a frequency below the threshold to the charge pump 86 (block 214). The threshold may, for example, correspond to characteristics of the coupler 74, and may, in some instances, be about 100 kHz or less. The charge pump 86 may then convert the coupler signal to a second DC signal, which may be a low (e.g., 0 or near 0) DC signal (block 216), and the second DC signal may be provided to the fuse actuator 82 (block 218). The fuse actuator 82, which may include circuit logic and/or a microcontroller, may interpret the low second DC signal as an indication that a fault has occurred and actuate one or more fuses 50 (block 220). Actuating one or more fuses may limit and/or prevent damage to other components, such as switches 52 and/or loads 40.

If a fault is not detected at block 206, the fault detector 80 is configured to transmit a third DC signal (e.g., a do NOT detonate fuse signal, 5 V signal) to the timer generator 84 (block 230). The timer generator 84 converts the third DC signal to a second AC signal (block 232). The second AC signal may, for example and without limitation, include a 400 kHz square wave, but may include other configurations and/or frequencies above the threshold. The timer generator 84 transmits the second AC signal to the coupler 74 (block 234). The coupler 74 may provide a second coupler signal corresponding to the second AC signal to the charge pump 86 of the second circuit section 72 (block 236), which may include the coupler 74 isolating the first circuit section 70 from the second circuit section 72. The charge pump 86 may convert the coupler signal to a fourth DC signal (block 238) and provide the fourth DC signal to the fuse actuator 82 (block 240). In accordance with receiving the fourth DC signal, the fuse actuator 82 may determine that a fault has not occurred and may not actuate the fuses 50 (block 242).

Figure 5:
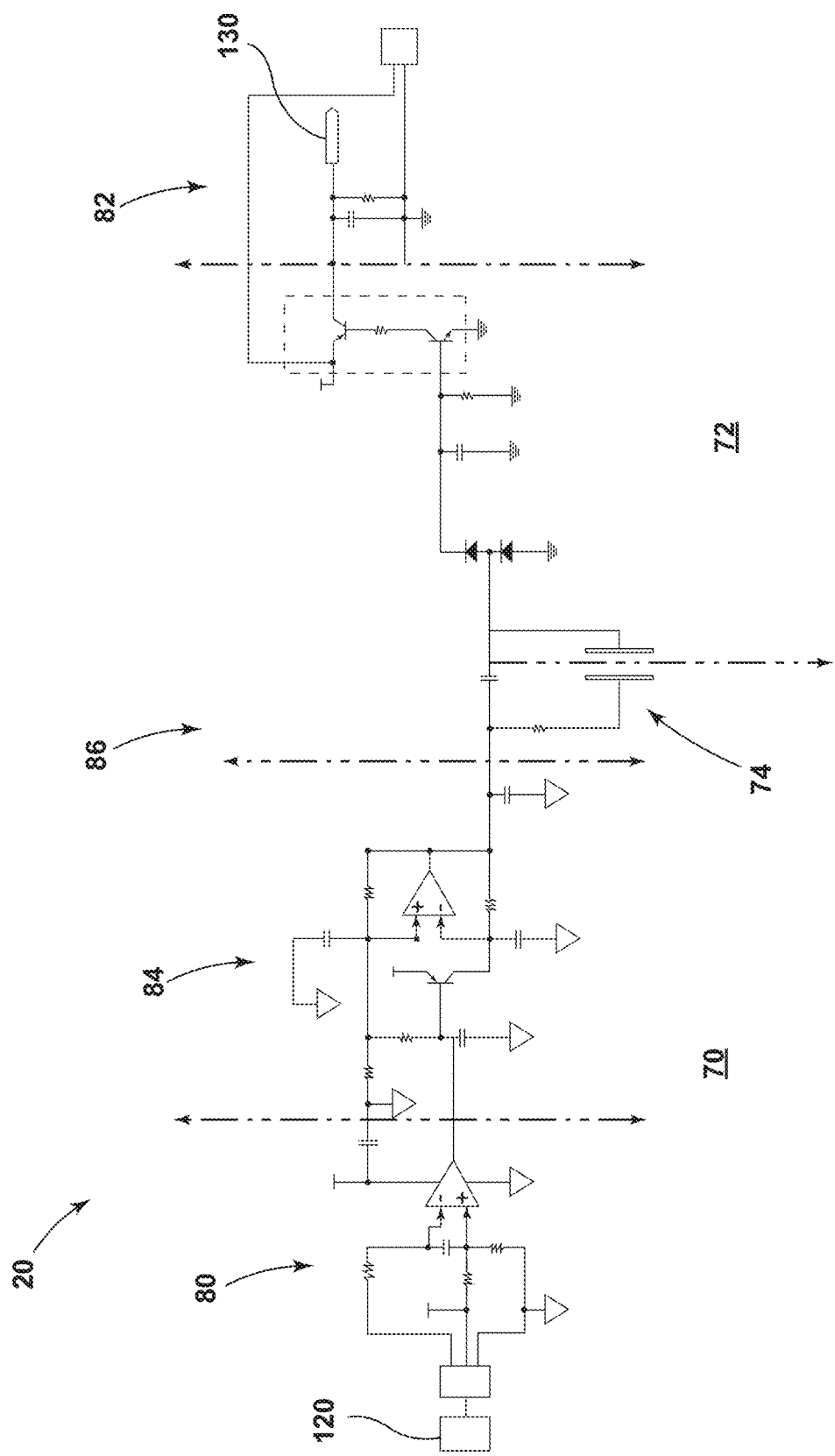
FIG. 5 is a circuit diagram generally illustrating portions of an embodiment of an electrical system according to teachings of the presenting disclosure.

Referring to FIG. 5, a circuit diagram for one example of an electrical system 20 is shown. A first circuit section 70 of the electrical system 20 includes a fault detector 80, which may include and/or be connected to a current sensor 120, and a timer generator 84 connected to the output of the fault detector 80. A coupler 74 is connected to the output of the timer generator 84 and couples the first circuit section 70 to the second circuit section 72 (e.g., for communication) while also isolating high voltages of the first circuit section 70 from the second circuit section 72. The second circuit section 72 includes a charge pump 86 connected to the output of the coupler 74 and a fuse actuator 82, which include and/or be connected to one or more detonators 130, connected to an output of the charge pump 86.

While an example embodiment is described above with the fault detector 80 providing a low signal in the event of a fault and a high signal when a fault is not detected, the configuration could be reversed. For example and without limitation, the fuse actuator 82 (e.g., circuit logic and/or a microcontroller thereof) may be configured to interpret a high signal as an indication of a fault and to actuate one or more fuses 50. Using a low signal in the event of a fault may allow the system 20

This disclosure includes, without limitation, the following embodiments:

1. A system, comprising: a power source; an electrical load selectively electrically connected to the power source; a pyrotechnic fuse electrically connected between the power source and the load; and an electrical subsystem electrically connected to the power source and the pyrotechnic fuse, the electrical subsystem comprising: a first circuit section including a fault detector that detects faults associated with the power source; a second circuit section including a fuse actuator; and a capacitive coupler electrically connected to the fault detector and the fuse actuator, wherein the capacitive coupler isolates the first circuit section from the second circuit section; wherein, in accordance with detecting a fault, the electrical subsystem actuates the pyrotechnic fuse to disconnect the power source from the load.

2. The system according to embodiment 1, wherein the capacitive coupler is embedded within a circuit board.

3. The system according to embodiment 1 or 2, wherein the capacitive coupler includes two parallel plates etched into the circuit board.

4. The system according to any preceding embodiment, wherein the first circuit section includes a timer generator electrically connected to the fault detector and the capacitive coupler; and the timer generator converts DC signals from the fault detector into AC signals that are provided to the capacitive coupler.

5. The system according to any preceding embodiment, wherein the second circuit section includes a charge pump electrically connected to the capacitive coupler and the fuse actuator; and the charge pump converts AC signals from the capacitive coupler to DC signals that are provided to the fuse actuator.

6. The system according to any preceding embodiment, wherein, in accordance with detecting the fault: the fault detector transmits a first DC signal to the timer generator; the timer generator converts the first DC signal to a first AC signal and provides the first AC signal to the capacitive coupler; the capacitive coupler blocks the first AC signal; the charge pump converts a coupler signal from the capacitive coupler to a second DC signal and transmits the second DC signal to the fuse actuator; and the fuse actuator receives the second DC signal and actuates the pyrotechnic fuse.

7. The system according to any preceding embodiment, wherein, in accordance with not detecting a fault: the fault detector transmits a third DC signal to the timer generator; the timer generator converts the third DC signal to a second AC signal and transmits the second AC signal to the capacitive coupler; the charge pump converts a second coupler signal from the capacitive coupler to a fourth DC signal and transmits the fourth DC signal to the fuse actuator; and the fuse actuator receives the fourth DC signal and does not actuate the pyrotechnic fuse.

8. The system according to any preceding embodiment, wherein the power source provides a voltage of at least 300 V.

9. The system according to any preceding embodiment, wherein the power source provides a voltage of at least 800 V.

10. The system according to any preceding embodiment, wherein at least one component of the second circuit section has a maximum voltage of 100 V or less.

11. The system according to any preceding embodiment, wherein the fault detector includes a current sensor electrically connected between the power source and the load.

12. The system according to any preceding embodiment, including: a second load selectively electrically connected to the power source; and a second pyrotechnic fuse electrically connected between the power source and the second load; wherein the fuse actuator is connected to the second pyrotechnic fuse; the fuse actuator includes a first detonator that actuates the load and a second detonator that actuates the second load; and in accordance with detecting a fault, the electrical subsystem actuates the pyrotechnic fuse and the second pyrotechnic fuse to disconnect the power source from the load and the second load.

13. The system according to any preceding embodiment, including: an additional pyrotechnic fuse connected between the power source and the load; a switch electrically connected between the pyrotechnic fuse and the additional pyrotechnic fuse; and wherein the fuse actuator is connected to the pyrotechnic fuse and the additional pyrotechnic fuse; and the fuse actuator includes a first detonator for the pyrotechnic fuse and a second detonator for the second pyrotechnic fuse.

14. The system according to any preceding embodiment, wherein the electrical subsystem disconnects the power source in 5 ms or less in accordance with detecting a fault.

15. A vehicle, including the system according to embodiment 1.

16. A method of operating the system according to embodiment 1, the method comprising: providing current from the power source to the load; monitoring the current from the power source via the fault detector; and in accordance with detecting the fault: providing a first DC signal from the fault detector to a timer generator of the first circuit section; converting, via the timer generator, the first DC signal to a first AC signal; providing the first AC signal to the capacitive coupler; providing a coupler signal from the capacitive coupler to a charge pump of the second circuit section; converting, via the charge pump, the coupler signal to a second DC signal; providing the second DC signal to the fuse actuator; and actuating, via the fuse actuator, the pyrotechnic fuse in accordance with receiving the second DC signal.

17. A system, comprising: a power source providing a voltage of at least 300 V; a pyrotechnic fuse electrically connected between the power source and a load; a switch electrically connected between the power source and the load; an electrical load selectively electrically connected to the power source via the switch and the pyrotechnic fuse; and an electrical subsystem electrically connected to the power source and the pyrotechnic fuse, the electrical subsystem comprising: a first circuit section including a current sensor; a second circuit section including a fuse actuator;

and a coupler electrically connected to the current sensor and the fuse actuator, wherein the coupler isolates the first circuit section from the second circuit section.

18. The system according to embodiment 17, wherein the coupler includes a parallel plate capacitor.

19. The system according to embodiment 17 or 18, wherein the coupler includes a transformer.

20. The system according to embodiments 17-19, wherein the electrical subsystem detonates the pyrotechnic fuse in accordance with detecting a fault to protect the switch from excess current from the power source.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes." "including." "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A system, comprising:
a power source;
an electrical load selectively electrically connected to the power source;

a pyrotechnic fuse electrically connected between the power source and the electrical load; and an electrical subsystem electrically connected to the power source and the pyrotechnic fuse, the electrical subsystem comprising:

a first circuit section including a fault detector that detects faults associated with the power source;

a second circuit section including a fuse actuator; and a capacitive coupler electrically connected to the fault detector and the fuse actuator, wherein the capacitive coupler isolates the first circuit section from the second circuit section;

wherein, in accordance with detecting a fault, the electrical subsystem actuates the pyrotechnic fuse to disconnect the power source from the electrical load.

2. The system of claim 1, wherein the capacitive coupler is embedded in a circuit board.

3. The system of claim 2, wherein the capacitive coupler includes two parallel plates etched into the circuit board.

4. The system of claim 1, wherein the first circuit section includes a timer generator electrically connected to the fault detector and the capacitive coupler; and the timer generator converts DC signals from the fault detector into AC signals that are provided to the capacitive coupler.

5. The system of claim 4, wherein the second circuit section includes a charge pump electrically connected to the capacitive coupler and the fuse actuator; and the charge pump converts AC signals from the capacitive coupler to DC signals that are provided to the fuse actuator.

6. The system of claim 5, wherein, in accordance with detecting the fault:

the fault detector transmits a first DC signal to the timer generator;

the timer generator converts the first DC signal to a first AC signal and provides the first AC signal to the capacitive coupler;

the capacitive coupler blocks the first AC signal;

the charge pump converts a coupler signal from the capacitive coupler to a second DC signal and transmits the second DC signal to the fuse actuator; and the fuse actuator receives the second DC signal and actuates the pyrotechnic fuse.

7. The system of claim 6, wherein, in accordance with not detecting a fault:

the fault detector transmits a third DC signal to the timer generator;

the timer generator converts the third DC signal to a second AC signal and transmits the second AC signal to the capacitive coupler;

the charge pump converts a second coupler signal from the capacitive coupler to a fourth DC signal and transmits the fourth DC signal to the fuse actuator; and the fuse actuator receives the fourth DC signal and does not actuate the pyrotechnic fuse.

8. The system of claim 1, wherein the power source provides a voltage of at least 300 V.

9. The system of claim 1, wherein the power source provides a voltage of at least 800 V.

10. The system of claim 1, wherein at least one component of the second circuit section is used with a maximum voltage of 100 V or less.

11. The system of claim 1, wherein the fault detector includes a current sensor electrically connected between the power source and the electrical load.

12. The system of claim 1, including:

a second load selectively electrically connected to the power source; and a second pyrotechnic fuse electrically connected between the power source and the second load;

wherein the fuse actuator is connected to the second pyrotechnic fuse;

the fuse actuator includes (i) a first detonator that actuates the pyrotechnic fuse and (ii) a second detonator that actuates the second pyrotechnic fuse; and in accordance with detecting a fault, the electrical subsystem actuates the pyrotechnic fuse and the second pyrotechnic fuse to disconnect the power source from the electrical load and the second load.

13. The system of claim 12, including:

an additional pyrotechnic fuse connected between the power source and the electrical load;

a switch electrically connected between the pyrotechnic fuse and the additional pyrotechnic fuse; and wherein the fuse actuator is connected to the pyrotechnic fuse and the additional pyrotechnic fuse; and the fuse actuator includes the first detonator for the pyrotechnic fuse and an additional detonator for the additional pyrotechnic fuse.

14. The system of claim 1, wherein the electrical subsystem disconnects the power source in 5 ms or less in accordance with detecting a fault.

15. A vehicle, including:

the system of claim 1.

16. A method of operating the system of claim 1, the method comprising:

providing current from the power source to the electrical load;

monitoring the current from the power source via the fault detector; and in accordance with detecting the fault:

providing a first DC signal from the fault detector to a timer generator of the first circuit section;

converting, via the timer generator, the first DC signal to a first AC signal;

providing the first AC signal to the capacitive coupler;

providing a coupler signal from the capacitive coupler to a charge pump of the second circuit section;

converting, via the charge pump, the coupler signal to a second DC signal;

providing the second DC signal to the fuse actuator; and actuating, via the fuse actuator, the pyrotechnic fuse in accordance with receiving the second DC signal.

17. A system, comprising:

a power source providing a voltage of at least 300 V;

a pyrotechnic fuse electrically connected between the power source and a load;

a switch electrically connected between the power source and the load;

an electrical load selectively electrically connected to the power source via the switch and the pyrotechnic fuse; and an electrical subsystem electrically connected to the power source and the pyrotechnic fuse, the electrical subsystem comprising:

a first circuit section including a current sensor;

a second circuit section including a fuse actuator; and a coupler electrically connected to the current sensor and the fuse actuator, wherein the coupler isolates the first circuit section from the second circuit section.

18. The system of claim 17, wherein the coupler includes a parallel plate capacitor.

19. The system of claim 17, wherein the coupler includes a transformer.

20. The system of claim 17, wherein the electrical subsystem actuates the pyrotechnic fuse in accordance with detecting a fault to protect the switch from excess current from the power source.

* * * * *